United States Patent [19]

Vierkötter et al.

[11] 4,438,869
[45] Mar. 27, 1984

[54] DOSING DEVICE WITH BALL VALVE AND OPERATING METHOD

[75] Inventors: Peter Vierkötter, Leverkusen; Paul-Otto Weltgen, Hilden, both of Fed. Rep. of Germany

[73] Assignee: Henkel Kommanditgesellschaft auf Aktien, Dusseldorf-Holthausen, Fed. Rep. of Germany

[21] Appl. No.: 348,065
[22] PCT Filed: Jul. 3, 1981
[86] PCT No.: PCT/EP81/00092
§ 371 Date: Feb. 8, 1982
§ 102(e) Date: Feb. 8, 1982
[87] PCT Pub. No.: WO82/00348
PCT Pub. Date: Feb. 4, 1982

[30] Foreign Application Priority Data

Jul. 10, 1980 [DE] Fed. Rep. of Germany ....... 3026067

[51] Int. Cl.³ .............................................. G01F 11/26
[52] U.S. Cl. ........................................ 222/1; 222/500
[58] Field of Search .............. 222/212, 477, 500, 463, 222/454, 211, 386, 1, 456

[56] References Cited

U.S. PATENT DOCUMENTS

| 2,919,056 | 12/1959 | Collins | 222/500 X |
| 2,943,767 | 7/1960 | Moro-Lin | 222/211 X |
| 3,129,859 | 4/1964 | Chappell | 222/500 X |
| 3,146,919 | 9/1964 | Chappell | 222/500 X |

FOREIGN PATENT DOCUMENTS 6617452 6/1968 Netherlands .
24593 of 1914 United Kingdom .

Primary Examiner—Stanley H. Tollberg
Attorney, Agent, or Firm—Hammond & Littell, Weissenberger and Muserlian

[57] ABSTRACT

Figure 1:
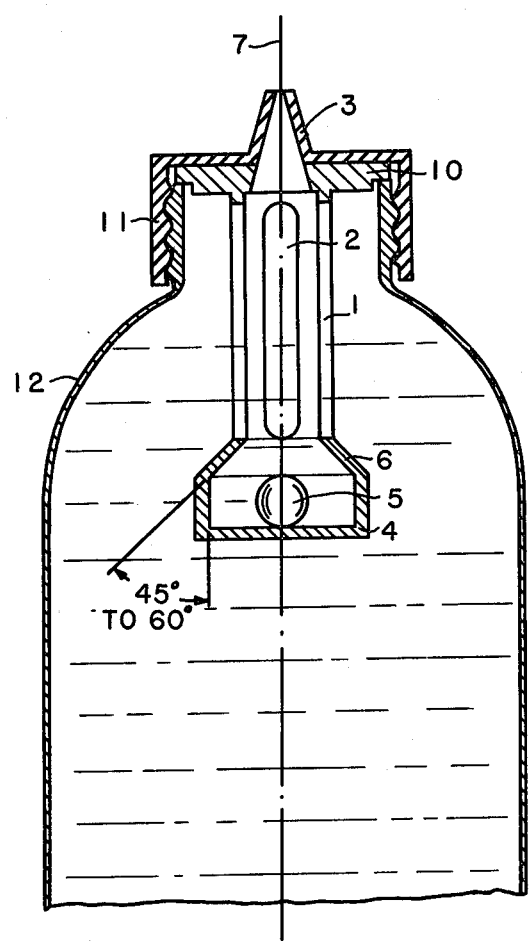

A dosing device with ball valve for attachment to a liquid container (12) with a valve ball (5) which closes the discharge opening (3) of the container in a tilted position of the latter is proposed. This is to make possible dosed squirting. This is achieved by a valve ball guide tube (1) which has over its length at least one lateral opening (2) leading towards the container interior and, at its end opposite the discharge opening (3) and the sealing valve ball seat (9), a lower part (4) expanding in funnel shape (6) from the tube wall (FIG. 1).

5 Claims, 3 Drawing Figures

DOSING DEVICE WITH BALL VALVE AND OPERATING METHOD

The invention relates to a dosing device with ball valve for attachment to a liquid container, especially a preferably plastic bottle, with a valve ball which closes the discharge opening of the container in a tilted position of the latter. The invention also relates to a method to operate the dosing device.

Dosers or dosing devices which release a certain amount of liquid each time the container is tilted are known from DE PS No. 12 02 672, for Example. This container must not be flexible because small pressures exerted on the container already can lead to considerable dosing variations. In a dosing device known from DE Gm No. 78 10 073 the doses can be predetermined relatively accurately by a dosing bubble alternately sealed against the container interior and against the outside and be removed from the dosing chamber by tilting the container, but the device is not only costly to manufacture because of the two valves, but also clumsy to handle. Also, because the product is removed from the dosing chamber by tilting, it flows from the chamber under no pressure.

It is an object of the invention to design the device of the above described kind so that dosing can take place under pressure or by pressure on the container so that a "squirt" corresponding to a defined amount of product can be dosed. The solution according to the invention, for a dosing device with a valve ball closing the discharge opening of the container in a tilted position of the latter is characterized by a valve ball guide tube which has over its length at least one lateral opening leading towards the container interior and, at its end opposite the discharge opening and the sealing valve ball seat, a lower part expanding in funnel shape from the tube wall over a length corresponding sizewise to at least half the ball diameter.

What the dosing device design according to the invention achieves is that when product is removed by tilting and, if applicable, by pressure on the container, the valve ball first remains in the lower part bent in funnel shape until it rolls, when the container is tilted further into a steeper head-down position, into the valve ball guide tube, dropping into the liquid until it hits the valve seat provided at the lower end of the guide tube. Dosing is ended abruptly when it hits the valve seat. Accordingly, when tilting the container, liquid first penetrates the lateral opening of the valve ball guide tube to the outlet of the dosing device. Since—in the presence of a vent—at least the entire pressure of the liquid column in the container rests on the dosing device outlet, the product discharges from the opening or nozzle under pressure. If the container wall is made flexible, the liquid pressure can be increased considerably—also in the absence of a vent—by squeezing the container. The liquid jet produced by tilting and, if applicable, by exerting pressure can then be terminated abruptly, according to the invention, simply by tilting the container further.

Due to designing the lower part attached to the valve ball guide tube in funnel shape it is achieved that the valve ball will always sink down in the liquid so that complete emptying of the container is assured also. As to the taper of the funnel-shaped or conical lower part attachment relative to the guide tube, various aperture angles are applicable, depending on the kind, especially the viscosity, of the liquid. Preferably, half the aperture angle formed between the longitudinal direction of the tube and the surface of the funnel-shaped lower part area should be at least 30°, in particular between about 45° and 60°. The adjustment of a limited product amount by means of the dosing device according to the invention is also predetermined by the ratio of the specific weight of the valve ball used to the specific weight of the liquid to be dosed—i.e. the relative specific weight of the ball. In addition to specifying the above mentioned aperture angle, the speed with which a liquid jet is to be cut off according to the invention, accordingly, can also be predetermined by the selection of the relative valve ball weight in question.

According to the invention, the connection between the container interior and the outlet of the dosing device is represented by at least one lateral valve ball guide tube opening. According to another feature of the invention, this lateral opening may be designed as longitudinal slot extending roughly parallel to the tube centerline and possibly reaching to the vicinity of the sealing valve ball seat or closure. Basically, however, several individual openings in the guide tube may also be provided instead of the slot. The product quantity still discharging from the discharge or squirt opening of the dosing device after the valve ball has dropped into the guide tube consists at least of the product volume which can be stored singly in the space between the discharge opening and the adjacent end of the slot or guide tube opening.

Figure 2:
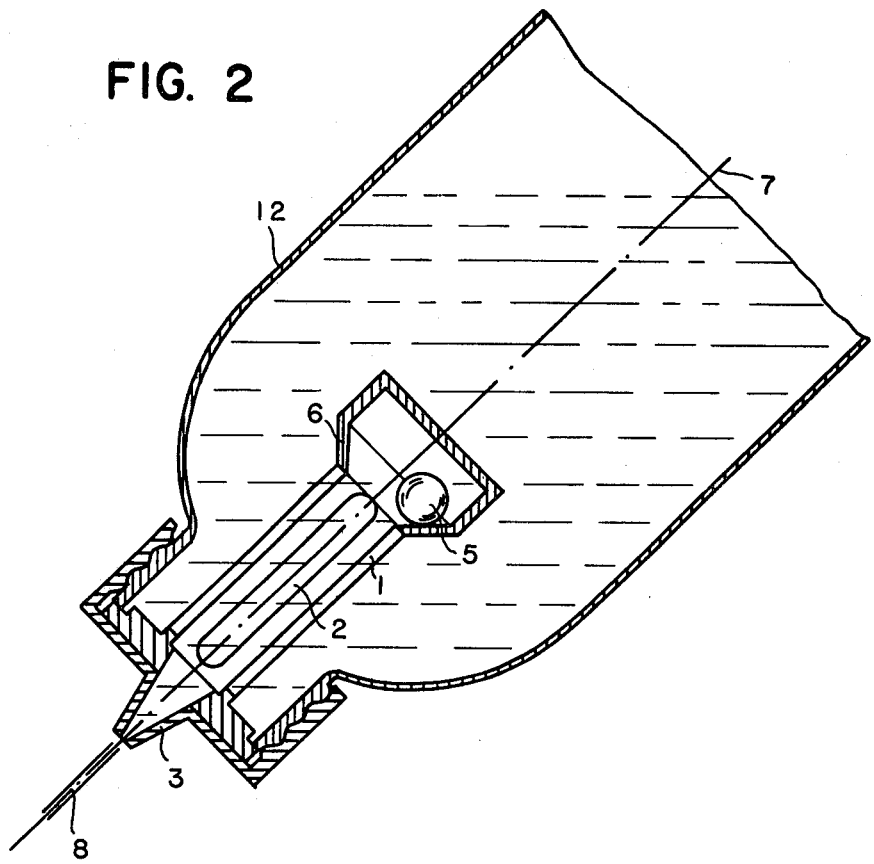
Figure 3:
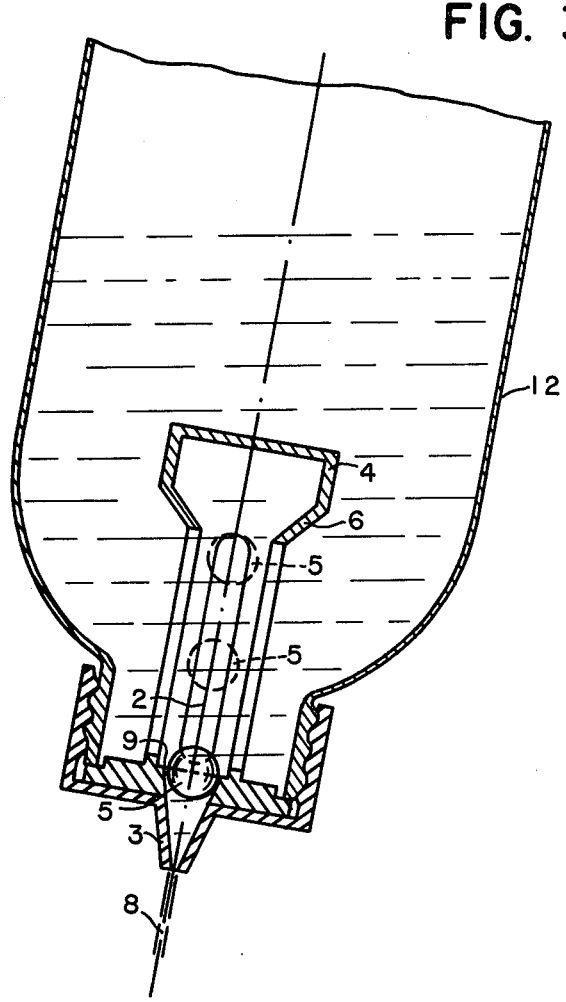

Further details of the invention are explained by way of the schematic representation of an embodiment example in the drawing, in which FIG. 1 shows a longitudinal section of a dosing device attached to a container, and FIGS. 2 and 3 different tilted positions of the dosing device according to FIG. 1.

In the embodiment example according to FIGS. 1 to 3, the device according to the invention consists of a valve ball guide tube 1 with longitudinal slot 2, to which tube is attached at one end a discharge opening 3 designed as squirt nozzle and at the other end a lower part 4 expanding from the tube wall in funnel shape. Sitting in the device is a ball 5. The size of the area 6 of the lower part 4 expanding in funnel shape from the tube wall and its inclination relative to the tube centerline 7 of at least about 30°, in particular about 45° to 60°, should be such that a ball 5 remains in the funnel-shaped area 6 of the lower part 4 without dropping into the tube 1 in a tilted position indicated approximately in FIG. 2, in which liquid 8 discharges from the discharge opening 3. But by further tilting according to FIG. 3 it should then be achievable for the ball 5 to drop down in the tube 1, hitting the sealing valve seat 9 on the discharge opening 3.

In the embodiment example, a head plate 10 to be fixed to the neck of a container 12 by means of a screw cap 11 is integrated in the dosing device. Basically, another fastening such as a stopper may also be provided in place of the screw connection. The dosing device according to the embodiment example contains no vent for the interior of the container 12. The latter, therefore, expediently consists of plastic, and the dosing action is effected by tilting and at the same time squeezing the wall of the container. When the dosing device is used in conjunction with a container of rigid material, it is expedient to provide a vent for the container interior, to be located in the area of the head plate 10 or a corresponding stopper.

List of Reference Numbers

1 = guide tube
2 = slot
3 = discharge opening
4 = lower part
5 = ball
6 = funnel-shaped area
7 = tube centerline
8 = liquid
9 = sealing valve seat
10 = head plate
11 = screw cap
12 = container

We claim:

1. A dosing device with ball valve for attachment to a liquid container with a valve ball closing the discharge opening of the dosing device in a tilted position of the container comprising a ball valve, a valve ball guide tube having at least one lateral opening leading towards the container interior over its length, wherein the inside diameter of the valve ball guide tube is clearly greater than the ball diameter and the ball diameter is clearly greater than the width of the at least one lateral opening in the valve ball guide tube, said valve ball guide tube having a discharge opening, a sealing valve ball seat at its discharge end and a lower part opposite its discharge end expanding in funnel shape from the tube wall for a length corresponding to at least half the ball diameter to a cylinder having a solid circular bottom, the funnel shaped so that half the aperture angle formed between the tube centerline and the surface of the funnel-shaped area of the lower part is between about 45° and 60°, whereby the ball remains in the funnel-shaped area of the lower part without dropping into the tube in a tilted position of the container not exceeding half the aperture angle.

2. A dosing device according to claim 1 wherein said lateral opening in the valve ball guide tube is a longitudinal slot running roughly parallel to the tube centerline.

3. A dosing device according to claim 2 wherein said longitudinal slot extends to the vicinity of said sealing valve ball seat.

4. A method for discharging liquid contents from a container closed with a dosing device with ball valve comprising a ball valve, a valve ball guide tube having at least one lateral opening leading towards the container interior over its length, wherein the inside diameter of the valve ball guide tube is clearly greater than the ball diameter and the ball diameter is clearly greater than the width of the at least one lateral opening in the valve ball guide tube, said valve ball guide tube having a discharge opening, a sealing valve ball seat at its discharge end and a lower part opposite its discharge end expanding in funnel shape from the tube wall for a length corresponding to at least half the ball diameter to a cylinder having a solid circular bottom, the funnel shaped so that half the aperture angle formed between the tube centerline and the surface of the funnel-shaped area of the lower part is between about 45° and 60°, whereby the ball remains in the funnel-shaped area of the lower part without dropping into the tube in a tilted position of the container not exceeding half the aperture angle, and having liquid contents, consisting of the steps of (1) tilting said container into a medium tilted position in a vertical direction with said discharge opening pointed downwards, where said valve ball remains in said funnel-shaped area, and said liquid contents are discharged by liquid pressure, and (2) for an abrupt termination of said discharge, said container is tilted further towards a vertical position with said discharge opening pointed downwards, where said valve ball drops in the valve ball guide tube to said sealing valve seat.

5. The method of claim 4 wherein the amount of discharge liquid contents is determined by the relative specific weight of said valve ball.

* * * * *